Sept. 20, 1955  L. B. EHRLICH  2,718,395
OPERATING MECHANISM FOR WINDOWS
Filed June 15, 1950 2 Sheets—Sheet 1
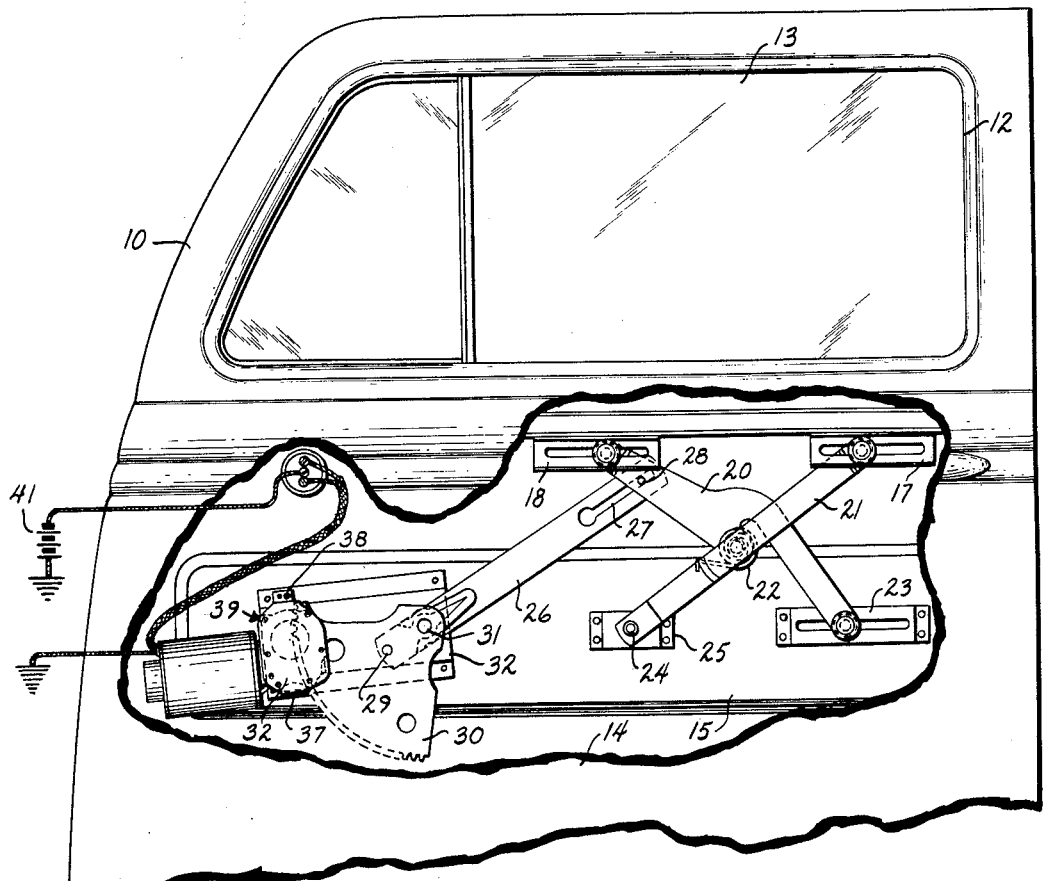
Fig. I
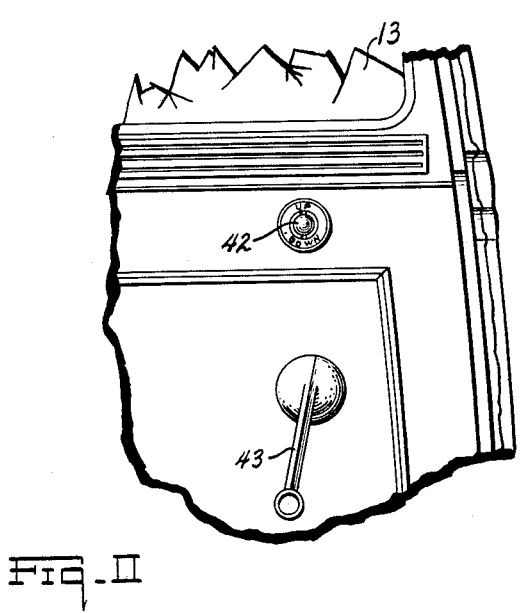
Fig. II
INVENTOR.
Louis B. Ehrlich
BY
Falvey, Souther & Stoltenberg.

Sept. 20, 1955  L. B. EHRLICH  2,718,395
OPERATING MECHANISM FOR WINDOWS
Filed June 15, 1950  2 Sheets-Sheet 2
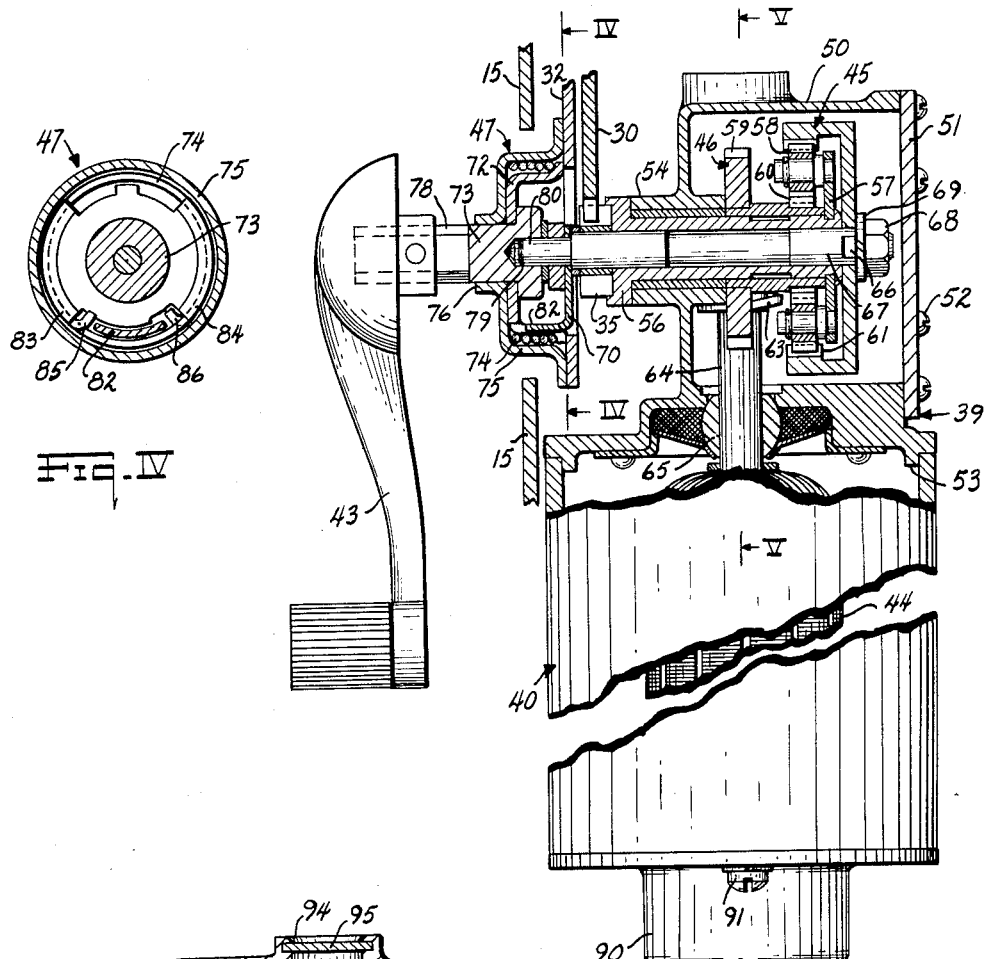
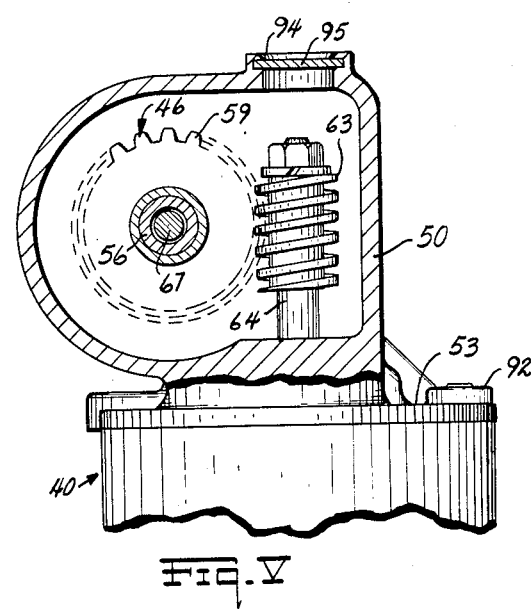
INVENTOR.
Louis B. Ehrlich
BY Falvey, Souther & Stoltenberg

United States Patent Office 2,718,395
Patented Sept. 20, 1955

2,718,395
OPERATING MECHANISM FOR WINDOWS

Louis B. Ehrlich, Toledo, Ohio

Application June 15, 1950, Serial No. 168,314

12 Claims. (Cl. 268—124)

The present invention relates to an operating mechanism and more specifically, though not exclusively, to a mechanism for actuating closures and windows of self-propelled vehicles.

The invention comprehends a mechanism for raising or lowering windows of automobiles that may be actuated concurrently by a power unit and by manual force, or by either as circumstances may require.

The invention comprises a load operating mechanism adapted to be automatically actuated by a small power unit as well as by hand power in the event of non-operation of the power unit and wherein the power actuating unit can be manually aided and the movement imparted to the load by the power unit neutralized, or the speed of such movement changed by manual manipulation.

The invention contemplates a novel driving arrangement that allows the use of a small and compact motor for actuating the conventional manually operated window regulators through a very efficient gear reduction train which also forms part of the manually operable means, so that manual actuating can be performed with less force, ease and safety.

The invention embraces a transmission system for two power sources, each provided with an irreversible driving connection with a planetary gear train for operating a load and wherein such connections establish the driving relation of the planetary train and function to effect a change in the gear ratio of said gear train to operate the load at different speeds.

The invention is also concerned with a load actuating mechanism comprising a small size electric motor connected to an epicyclic or planetary gear reduction train to provide a predetermined reduction ratio. The planetary train is provided with means for rotating the normally constrained member, so that when the motor is not operating, the gear connected thereto is then the constrained member, whereby rotation imparted to the normally constrained member produces a different reduction ratio.

According to the foregoing summary of the invention, indicating its general nature and substance, its main objective is to provide an actuator in which an electric motor of small size is connected to a planetary gear unit for actuating a load such as a vehicle window. The gear unit is provided with operating means connected thereto, whereby the motor can be manually assisted or the load actuated solely by manual power.

Prior to the present invention, the electric motors used for raising or lowering windows of automobiles were designed to provide the maximum requirements for the most adverse conditions, such as cold weather and wet conditions. The commercially acceptable motors employed to meet such conditions were bulky, heavy, and highly over-powered for normal operating conditions. To accommodate such motors, vehicle doors of considerable thickness and the use of special supporting members for taking the reaction force of the motor were required. Moreover, such motors were of a type having high deceleration torque and kinetic energy of rotation of the armature, so that irrespective of very complex adjusting mechanisms, including limit switches, trouble resulted by high stored energy which must be rapidly dissipated after opening of the switches, causing sticking or jamming when the window reached the end of its travel. The sticking or jamming produced by such rapid dissipation of the motor energy, due to its high deceleration and kinetic energy of the armature, was such that the starting torque of the motor was insufficient to free the mechanism and associated parts for further operation of the window. This caused very unreliable operation and performance failures.

It is an object of the present invention to overcome and successfully cure the foregoing listed drawbacks and performance failures by providing a mechanism wherein the electric motor can be assisted by manual force to actuate the load, such as a vehicle window, under adverse conditions or during wet and cold weather. The motor effectively moves the window to the selected positions under normal conditions without causing sticking, jamming or subjecting the parts to high stresses, thereby eliminating the complex adjusting mechanisms with limit switches hereinbefore required.

Another object of the invention is the provision of a window actuating mechanism utilizing a reversible electric motor of a small size connected to a planetary gear train having releasable clutch means or a drive release spring brake device for holding the constrained member gear of said train and operable for imparting rotation thereto in counter or clockwise direction changing the gear ratio of said train to provide a variable raising or lowering movement or regulate the speed of the window pane between selected positions.

Another object of the invention is the provision of a window operating mechanism including a planetary gear reduction adapted to be actuated by an electric motor, as well as by hand power, in the event of non-operation of the motor, providing different reduction ratios for electric motor and for hand operation.

Another object of the invention is the provision in a window operating mechanism of an electric motor of a small size having low deceleration torque and small kinetic energy of rotation of the armature and parts rotated thereby, so that the motor can be stalled or stopped by the window reaching the end of its travel without binding or jamming or subjecting the mechanism to high stresses, so that the use of complex adjusting devices and limit switches is dispensed with.

Another object of the invention is to provide in a window actuating mechanism an epicyclic gear train having means and being so arranged that either of two of the member gears can be selectively constrained to provide different gear ratios.

Another object of the invention is the provision of a window actuating mechanism, including a power unit and an epicyclic gear train connected thereto, the gear train being associated with self-energizing clutch means which operate to establish a driving relation and provide means operable to change the gear ratio of said epicyclic gear train.

Another object of the invention is the provision of a window actuating system, including a motor connected through a worm and worm-wheel to planetary gearing wherein clutch means connected to said gearing establishes a driving relation providing means to change its gear ratio, and will prevent movement of the window by vibration or by unauthorized persons.

Another object of the invention is to provide a mechanism comprising a reversible electric motor having a gearing system connected thereto for operating a load. The gearing system includes non-reversible torque transmitting gears and is provided with a releasable two-way spring brake means for holding a gear stationary to obtain a predetermined gear ratio and operable to permit rotation of said gear in counter or clockwise direction, whereby the gear ratio of the gearing system can be altered by manual rotation.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. I is a front elevation of an automobile door with portions broken away to show the invention applied thereto for raising and lowering a window closure;

Fig. II is a fragmentary rear elevation of the door showing the manual operating controls for the mechanism of the invention;

Fig. III is a side elevation with portions in section to show the power transmitting system of the invention;

Fig. IV is a sectional view taken along line IV—IV of Fig. III looking in the direction of the arrows;

Fig. V is a sectional view taken along line V—V of Fig. III looking in the direction of the arrows.

The invention may be incorporated in any type of apparatus used for moving a part to a selected position and, for a practical application of its principles, I have elected to illustrate in the drawings the invention as embodied in a window or closure actuating system using an electric motor for a main prime mover. However, it is to be understood that I do not wish to limit the invention to the particular form shown and that I contemplate its use with any suitable prime mover and whenever the invention may be found to have utility.

Referring to the drawings which illustrate the power transmitting system of the invention as a mechanism for raising or lowering a window of an automobile, In Fig. I is shown a door 10 having a window of the non-draft ventilating type. The rear portion 12 of the window opening is closed by a vertical slidable reciprocating window pane 13, housed with the operating system of the invention in the window well or recess formed by the lower section of the door panels 14 and 15.

The window pane or closure 13, which is shown in window closing position, is formed of glass or any other suitable transparent material. The lower end of the window pane 13 is provided with spaced metallic guide members 17 and 18 having elongated slots to receive the top studs or rollers of a window regulator forming the parallelogram action for moving the window pane 13 preventing its cocking or binding in the vertical guides of the frame-work of the window.

The window regulator, which is shown as of the conventional cross-arm type, comprises centrally interconnected pivoted arms 20 and 21, provided at their pivotal connection with a counter-balance spring 22 and having their lower extremities connected respectively to a guide or a slotted bracket 23 and to a pivot stud 24 carried by a plate 25. The bracket 23 and the plate 25 are fixed to the inner frame or door panel 15 within the window well.

The cross arms 20 and 21 of the regulator are operated in unison to move the window pane 13 up and down by a swinging arm 26 through a pin and a slot connection. This connection is formed by an elongated slot 27 located at the end of arm 26, in which the pin 28, fixed adjacent to the upper end of the regulator arm 20, has a sliding fit. The inner end of the arm 26 is fixedly secured as at 29 to the gear sector 30. Both the arm 26 and the gear sector 30 are mounted to rotate about the axis of the pivot or stud 31 fixed to the embossed mounting plate 32 which is attached to the inner frame or panel 15. The segmental gear 30 is rotated to swing the arm 26 by its meshing engagement with the pinion or output member 35 of the power transmitting system of the invention. In the embodiment illustrated, this transmitting system takes the form of a self-contained unitary assembly detachably mounted through the outwardly projecting flanges 37 and 38 of the U-shape bracket 39 upon the regulator mounting plate 32.

As particularly shown in Fig. III, the actuator for moving a load which embodies the power transmitting system of the invention comprises two sources of power 40 and 43 for operating through a planetary of epicyclic gear reduction train 45 the pinion or output member 35. The two power sources are connected to the gear train 45 by irreversible driving connections 46 and 47 respectively which are provided to establish the driving relation of planetary gearing for operating output member or pinion 35 by said sources either separately or concurrently.

The main power source or prime mover of the invention is shown in the form of a reversible electric motor 40, adapted to be energized through suitable conductors by the electric storage battery 41 of the automobile, having its circuit controlled by the switch 42. The other source of power, or secondary prime mover, is shown in the form of a manually operable crank handle 43 projecting into the body compartment of the automobile. The electric motor switch 42 and the manually operable crank handle 43 constitute the manual operating controls for the power transmitting system of the invention and are readily accessible to the driver of the automobile, as shown in Fig. II.

The irreversible driving connection 46, which is directly connected to the prime mover 40, is in the form of non-reversible torque transmitting gears, highly efficient when the same are operated by the prime mover 40 but being of a type which substantially locks when backward rotation is impartd thereto. The irreversible driving connection 47, which is associated with the secondary source of power or crank handle 43, is in the form of a releasable spring clutch or a dive release spring brake device which prevents that backward rotation be imparted to the crank handle 43.

The irreversible driving connection 47 is arranged with the planetary gear train 45 to establish its driving relation by normally holding stationary a gear of said train to provide a predetermined gear reduction ratio when the motor 40 operates the output member 35. In addition, the connection 47 permits that rotation be imparted to the gear of the train connected thereto for manually assisting the motor through the operation of the crank handle 43 to operate the load or effect a different gear reduction ratio by concurrent power and manual actuation.

The irreversible driving connection 46 between the motor 40 and the planetary gear train in the embodiment shown takes the form of a worm and worm wheel drive. This irreversible driving connection functions, when the motor 40 is operating, to establish the driving relation of the planetary gear train 45 by holding stationary another member gear of the planetary train than the one held by the irreversible driving connection 47. Thus, through the provision of the irreversible driving connection 46, a different reduction ratio is obtained by the planetary train 45 when the secondary source of power or crank handle 43 manually operates the output member 35, whereby manual actuation of the load can be performed with less force in the event of non-operation of the motor or prime mover 40.

In carrying out the application of the self-contained assembly of the invention to the window regulator mechanism, an open-ended casing 50, which is secured and closed by the top portion 51 of the mounting bracket 39 by a suitable attaching means such as screws 52, forms a closed lubricating chamber providing a support for the gearing units as well as forming, at one side, the drive end head 53 of the motor 40.

The casing 50 is provided, at its rear section with a tubular projecting boss 54 providing a bearing for the output or a hollow shaft 56, to which is directly connected at its outer end, the output member or pinion 35. The inner end of the hollow shaft 56 carries in fixed relation the spider or follower 57 of the planetary gear train. The spider 57 is provided with stud shafts acting as journals for the differential gear members or planets 58 interconnected with the sun gear 60 and ring gear 61. The sun gear 60 is directly secured by means of a hollow tubular member to the worm wheel 59 of the irreversible connection 46, which is driven by the worm 63 detachably connected to the motor armature shaft 64. The power input or motor shaft 64 is journaled at one end on a self-aligning bearing 65 supported on the motor drive end head 53. The ring gear 61 is detachably connected by means of flat sections 66 to the central shaft 67 and locked in position by means of a nut 68 threaded at the end of the shaft and a suitable lock washer 69. Adjacent the outer end of the central shaft 67 is rigidly fixed the driven member 70 of the irreversible driving connection or self-energizing spring clutch 47 connected to the secondary source of power.

The irreversible driving connection 47 comprises the driven member 70 adapted to be rotated by the driving member 72 fixed to the operating shaft 73. The driving member 72 is held against backward rotation by the action of a self-energizing lock spring 74 which exerts its expansive force to frictionally grip the inside surface of the stationary cup-shaped housing 75 attached to the window regulator mounting plate 32. The top section of the housing 75 projects through an opening in the door panel 15 and its central portion forms a bearing 76 for the cylindrical shank of the operating shaft 73 which rotates the driving member 72 by the manually operable crank handle 43 detachably secured to its outer squared end 78.

The inner end of the operating shaft 73 of the irreversible torque transmitting connection 47 is provided with an opening 79, on which is journaled the end 80 of the shaft 67, to which is fixed the driven member 70. This member is formed with an arcuate portion 82 which has limited angular motion between the wings 83 and 84 of the driving member 72. The ends of the lock spring 74 project inwardly forming hooks 85 and 86 which are spaced apart from each other to permit limited angular motion of the driving member before the spring hooks are engaged respectively by the wing sections 83 and 84 of the driving member 72. Normally, the lock spring 74 exerts an expansive force which is enhanced by the engagement of either of the spring hooks with the arcuate portion 82 of the driven member 70 when the same is urged for rotation in one or the other direction, so that the same is held in fixed position, preventing that backward rotation, due to torque reaction, from being imparted to the crank handle or secondary power force 43.

It should be noted that when the driving member 72 is rotated by the crank handle 43 in clockwise or counter-clockwise direction, either hook 85 or 86 of the spring 74, as the case may be, is engaged by either of the wing sections 83 or 84 of the driving member 72 causing the lock spring 74 to be contracted and, therefore, to release its frictional hold within the stationary housing 75. Thus manual rotation imparted to the crank handle 43 is freely transmitted to the driven member 70 for actuating the output member or pinion 35 through the planetary gear train 45.

In carrying the invention into practice, a planetary gear train, such as one in which the ring gear 61 has 36 teeth or a pitch diameter of 1.500, in association with the sun gear 60 of 18 teeth or a pitch diameter of .750 interconnected by the planet gears 58 having 9 teeth or a pitch diameter of .375, was found to be very effective. A worm drive 46, associated with said planetary gear train 45, is one in which the worm 63 is of double thread in mesh with the worm wheel 59 having 34 teeth, provides a very efficient reduction gear system having a ratio of 51 to 1 between the motor shaft and the output member or pinion 35 when the ring gear is the constrained member, in which the planetary train provides a reduction ratio of 3 to 1. This planetary gearing provides a reduction ratio of 1½ to 1 between the secondary source of power of manually operable crank handle 43 and the output member or pinion 35 when the sun gear 60 is the constrained member gear.

It should be noted that by the interconnection of the two power sources 40 and 43 with the planetary gear train 45, not only can the motor 40 can be manually aided to move a load such as the window pane 13 but the movement imparted thereto by the motor 40 through the output member 35 can be neutralized or the speed of such movement modified by changing the gear ratio of the planetary gear train 45 by rotation of the crank handle 43. Changes in the gear ratio of the planetary gear train 45 can be readily produced through the rotation of the ring gear 61 by manual operation of the crank handle 43 during the time the motor 40 is operating the output member 35. Manual rotation of the ring gear 61 in the same direction as that imparted to the sun gear 60 by the motor causes a decrease in the gear ratio while rotation of the ring gear 61 in the opposite direction effects an increase of said gear ratio. Thus the output member 35, and thereby the load, can be operated at different speeds by the concurrent operation of the motor 40 and the secondary source of power 43.

The high reduction ratio produced by the worm and worm wheel gearing 46 in association with the planetary train 45 serve to provide considerable reduction in the rotating movement, increasing the mechanical advantage for operating a load such as the window pane 13. Thus, a prime mover or motor can be used for rapid movement of the window in which the armature has a rotating speed in the range of 3,000 to 4,000 R. P. M.

One important feature of the invention is manifested by the utilization for the main power source or prime mover 40 of a reversible electric motor of small size having relatively high rotating speed. The motor 40 is designed to provide the proper speed-torque characteristics for operating the window pane 13 through the gear reduction system 45–46 using an armature 44 having a very low polar moment of inertia. The main objective in the motor design is to provide the motor torque characteristics with such type of an armature, so that the same has low deceleration torque and a small kinetic energy of rotation, whereby the armature can be stalled or stopped by the window reaching the end of its travel without binding or jamming, or subjecting the parts associated therewith to high stresses. The type of armature contemplated, having very low polar moment of inertia, may be obtained by reducing to a minimum its diameter and decreasing its peripheral mass using maximum magnetic tooth densities, especially at those sections adjacent to the outer diameter of the armature.

As shown in Figs. III and V, the motor 40 has its field frame and commutator end head 90 detachably secured to the side of the housing 50 which forms the motor drive end head 53 by suitable attaching screws 91 threaded into bosses 92 formed on the rear surface of the drive end head 53. The commutator end head 90 is provided with a suitable bearing for the outer end of the armature shaft 64. In order to facilitate the assembly of the unit, the housing 50 is provided with an opening 94 closed by a suitable means 95.

It can be seen from the foregoing that it will only be necessary for the automobile driver to move the operating member of the switch 42 from its central to either the "Up" or "Down" position indicated in Fig. II to impart the desired movement to the window pane 13. Setting of the switch operating member 42 in either of said positions will cause the energization of the electric motor whereby its armature shaft 64 will actuate the worm and worm-wheel drive 46 causing the operation of the planetary system 45 to rotate the output member 35. The sun gear 60, during such actuation, acts as the driver and the ring gear 61 is held constrained by the irreversible driving connection 47. The rotation of the driving pinion 35 will impart rotary movement to gear sector 30 causing the swinging arm 26 to operate in unison the regular arms 20 and 21 and thereby move the window pane 13. When the window pane 13 reaches the end of its travel, as determined by a suitable stop, the motor armature 44 is stopped or stalled without binding or jamming, or subjecting the mechanism to high stresses. The return of the switch operating member 42 to its central position will disconnect the motor 40 from the battery 41, retaining the window pane 13 in the desired position. Due to the action of the irreversible driving connections 46 and 47, the window pane will remain fixed in any selected position as such connections will prevent movement of the window by vibration and by unauthorized persons.

In the event that, due to extremely adverse conditions, the energization of the motor 40 will be insufficient to move the window pane 13, the actuation of the motor 40 can be aided by the turning of the crank handle 43. Thus, the power transmission mechanism of the invention provides very effective means to move the window under adverse conditions, or during wet and cold weather.

In the event of non-operation of the motor 40 or when it is desired to use manual force for operating the window, rotation of the crank handle 43 will be sufficient to turn the output member 35 for rotating the gear sector 30 of the regulator to thereby move the window pane 13. The rotation of the crank handle 43, fixed to the operating shaft 73, will move the driving member 72, urging into contact either of its wing sections 83 or 84 with either of the spring hooks 85 or 86 for releasing the locking engagement of spring 74 with the housing 75. The releasing of the spring 74 will permit the driving member 72 to turn by the driven member 70 the shaft 67, to which is fixed the ring gear 61 of the planetary gear train to thereby impart rotation to the driving pinion 35. During such hand operation, the sun gear 60 establishes the driving relation of the planetary gear train 45 by being held stationary through the worm wheel 59 and worm 63 forming the non-reversible torque transmitting connection 46.

If the driver of the automobile, for any reason whatever, desires to change the speed of movement of the window pane 13 during the operation of the mechanism by the motor 40, manipulation of the crank handle 43 will effect rotation of the normally restrained ring gear 61 of the planetary system 45. The arrangement of the invention, as hereinbefore pointed out, is such that rotation to the ring gear 61 can be imparted by the crank handle 43 in the same or in opposite directions to that imparted by the motor shaft 64 to the sun gear 60. Thus, the movement imparted to the window pane 13 by the motor can be neutralized or its speed materially changed by manual actuation by the crank handle 43.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. A window actuating mechanism comprising a driving pinion, a member adapted to be actuated by said driving pinion for moving a window pane between selected positions, an electric motor, the sun gear of a planetary gear reduction train operated by said electric motor, the follower of the planetary gear train operating said driving pinion, and a drive release spring brake device holding stationary a shaft to which is fixed the ring of the planetary gear train, said drive release spring brake device being manually rotated to impart movement to the shaft to which is fixed said ring gear to thereby apply manual force to assist the electric motor in operating said driving pinion to actuate said member to move the window pane between the selected positions.

2. A window actuating mechanism comprising a member adapted to be actuated for moving a window pane between selected positions, power operated means, a planetary gear reduction train interposed between the power operated means and said member, and a releasable two-way spring brake for holding stationary the shaft to which is fixed the constrained gear of said train, said spring brake being manually releasable and operated to impart rotation to said gear to thereby assist the power operated means in actuating said member for moving the window pane between the selected positions.

3. A power transmitting system for two power sources adapted to move a window closure into a predetermined position, an output member of said system associated with said closure so as to transmit movement thereto, an electric motor forming the main power source for operating said output member so as to in turn move said closure, a planetary gear train connected to said output member, interconnected worm and worm wheel interposed between the motor and the sun gear of said planetary gear train forming an irreversible torque transmitting connection between the motor and gear train, a crank adapted to be manually rotated forming a secondary power source for operating said output member so as to in turn move said closure through said planetary train, a two-way releasable spring brake interposed between said crank and the ring gear of said planetary gear train forming an irreversible torque transmitting connection between the crank and planetary train, each of said irreversible connections functioning to establish the driving relation of the planetary gear train and providing means to effect a change in the gear ratio of said gear train to operate the output member at different speeds.

4. In an actuator for moving a part into a predetermined position, a driven member associated with said part so as to transmit movement thereto, an electric motor operable for moving said driven member so as to in turn move said part, a planetary gear train having its sun a member gear connected to the motor and its follower gear to said driven member, a drive release spring brake means for holding stationary a gear shaft to which is fixed the ring of said train providing a predetermined reduction ratio for the actuation of said part by said motor, and a member adapted to be manually operated to release said spring brake means and impart rotation through said spring brake means to the shaft to which is fixed the ring gear so that when the motor is not operating the sun gear connected thereto is held stationary whereby the gear train provides a different reduction ratio for the actuation of said part by manual operation.

5. An actuating mechanism comprising a closed casing adapted to retain a lubricant, an output member projecting outside of said casing, said member associated with a load for imparting movement thereto between selected positions, bearing means formed on one of the outer walls of said casing, an output shaft connected to said output member journaled on said bearing means and projecting within the casing, a power input shaft having a portion located within said casing, a planetary gear train within said casing, the side gears and rotatable follower of the planet gears of said planetary gear trains mounted on shafts located in concentric relation with said output shaft and said shafts arranged for coaxial rotation on the said bearing means formed on one of the outer walls of said casing, a worm gear in said casing fixed to said portion of the power input shaft which is located within the casing, and a worm wheel mounted on the shaft upon which is mounted the sun gear of said planetary gear train, said worm gear and worm wheel being constructed and arranged to provide a non-reversible torque-transmitting connection to prevent movement of the load by vibration or by an unauthorized person.

6. In an actuator for moving a load, an electric motor, a closed casing adapted to retain a lubricant, a rotatable output member projecting outside of said casing connected to means operable for imparting movement to the load between selected positions, bearing means formed on one of the outer walls of said casing, an output shaft adapted to rotate said output member journaled on said bearing means projecting within the casing, an input shaft connected to said electric motor, said input shaft having a portion located within said casing, an epicyclic gear train within said casing, the member gears and the rotatable follower of the differential gears of said epicyclic gear train mounted on shafts located in concentric relation with said output shaft and arranged for coaxial rotation on the said bearing means formed on one of the outer walls of said casing, a worm gear in said casing fixed to the said portion of the input shaft which is located within the casing, a worm wheel meshing said worm gear and having a driving connection with one of the member gears of said epicyclic gear train, and a releasable two-way spring brake means located outside of said closed casing connected to one of the member gears of said epicyclic gear train for holding said member gear against rotation, said worm gear and worm wheel being constructed and arranged to provide a non-reversible torque-transmitting connection to prevent movement of the load by vibration or by an unauthorized person.

7. A window actuating mechanism comprising a high speed electric motor in the range of 3,000 to 4,000 revolutions per minute and characterized by having small kinetic energy of rotation, the armature of said motor being of comparatively small diameter and very low polar moment of inertia and with the maximum magnetic tooth densities adjacent to its outer periphery, an output member associated with the window pane for moving the same into a predetermined position, a gear train providing speed reduction means between the said motor armature and said output member, said motor and gear train being constructed and arranged so that the motor armature is stopped by the window reaching the end of its travel into a predetermined position without locking the mechanism in such position.

8. A window actuating mechanism comprising a high speed electric motor in the range of 3,000 to 4,000 revolutions per minute and characterized by having low deceleration torque and a small kinetic energy of rotation for its rotating parts, the armature of said motor being of comparatively small diameter and having a small peripheral mass with its maximum magnetic tooth densities adjacent to its outer diameter, an output member connected to means operable to move the window pane into selected positions, a gear train providing speed reduction means of at least 51 to 1 speed ratio and having a member gear connected to said output member, and another member gear of said gear train connected to the armature shaft, said motor and gear train being constructed and interconnected so that the motor armature can be stalled by the window reaching the selected position without locking the window actuating mechanism in such position.

9. An actuating mechanism for moving a part to a selected position which is determined when said part engages a stop comprising a high speed electric motor in the range of 3,000 to 4,000 revolutions per minute and characterized by having low deceleration torque and a small kinetic energy of rotation for its rotating parts, the armature of said motor being of comparatively small diameter with its maximum magnetic tooth densities adjacent to its outer diameter and having very low polar moment of inertia and small peripheral mass, an output member associated with said part for moving the same to the selected position, a gear train providing speed reduction means of at least 51 to 1 speed ratio, said gear train having a member gear connected to said output member, and another gear of said gear train connected to the motor armature shaft, said motor and gear train being constructed and arranged so that the motor armature can be stopped when the said part engages the stop without locking the actuating mechanism in such position.

10. A window actuating mechanism comprising a closed casing adapted to retain a lubricant, an output member projecting outside of said casing being associated with a window pane for imparting movement thereto between selected positions, main and secondary bearing means formed on the outer walls of said casing, an output hollow shaft in said casing journaled on said main bearing means and being connected to said output member for operating the same, an input shaft journaled on said secondary bearing means, said input shaft having a section located within said casing, a planetary gear train within said casing, the sun gear, the ring gear and the rotatable follower of the planet gears of said planetary gear train fixed to shafts mounted in concentric relation within and on the exterior of said output shaft and being arranged for coaxial rotation on said main bearing means, a worm gear in said casing fixed to the said section of the power input shaft which is located within the casing, and a worm wheel directly secured to the shaft upon which is fixed the sun gear of said planetary gear train, said worm gear and worm wheel being constructed and arranged to provide a non-reversible torque-transmitting connection for holding the window pane in position and preventing accidental movement of the window pane by vibration.

11. A driving mechanism including primary and secondary driving means, a housing adapted to contain a lubricant, an input power shaft rotatably mounted on one of the walls of said housing, an output member located outside of said housing, an output shaft connected to said output member for driving the same, said output shaft rotatably mounted on another wall of said housing, said output shaft having connections common to both of said driving means, a driving connection between the primary driving means and the input power shaft, said driving connection including a worm and worm wheel drive located within the housing whereby the input power shaft is locked against rotation when the primary driving means are not in operation, a drive shaft journaled within the housing and having a portion projecting outside of said housing for connection with the secondary driving means, a drive spring brake device connected to the said outside projecting portion of said drive shaft for holding said shaft against rotation, a member operable by said secondary driving means to release said spring brake device when rotation is imparted thereto by the secondary driving means, and planetary gearing located within the housing operatively connected to said worm wheel and to said drive shaft whereby rotation of the output shaft will be effected when either of the driving means is operated.

12. An actuating mechanism comprising an output member associated with a part for imparting movement thereto between selected positions, a hollow member forming an output shaft for operating said output member, a follower gear carried by means fixed to said hollow member, a central shaft located within said hollow member, a ring gear meshing with said follower gear fixed to said central shaft, a driving shaft mounted upon said hollow member, a sun gear fixed to said driving shaft, a drive release spring brake device connected to said central shaft for holding the ring gear against rotation, interconnected gearing through which torque transmission is irreversibly connected to said sleeve adapted to hold said sun gear against rotation, power operated means for actuating said interconnected gearing to rotate said sun gear for operating said output member, and means manually operable for effecting the release of said drive spring brake device and impart rotation to said ring gear for operating the output member.

References Cited in the file of this patent

UNITED STATES PATENTS

| | | |
|---|---|---|
| 1,424,538 | Widmer | Aug. 1, 1922 |
| 1,636,519 | Larsen | July 19, 1927 |
| 1,948,709 | Hackethal | Feb. 27, 1934 |
| 2,331,260 | Wiseman | Oct. 5, 1943 |
| 2,420,552 | Morrill | May 13, 1947 |
| 2,453,949 | Ulinski | Nov. 16, 1948 |
| 2,519,356 | Curry | Aug. 22, 1950 |
| 2,548,847 | Rossman et al. | Apr. 10, 1951 |

FOREIGN PATENTS

| | | |
|---|---|---|
| 360,041 | Italy | Mar. 8 1937 |
| 485,235 | Great Britain | May 17, 1938 |
| 610,746 | Great Britain | Oct. 20, 1948 |